United States Patent

[11] 3,551,705

[72] Inventor Hans Y. Juliusburger
Putnam Valley, N.Y.
[21] Appl. No. 791,423
[22] Filed Jan. 15, 1969
[45] Patented Dec. 29, 1970
[73] Assignee International Business Machines Corporation
Armonk, N.Y.
a corporation of New York

[54] ASYMMETRIC DELAY CIRCUIT

9 Claims, 3 Drawing Figs.

[52] U.S. Cl. .......... 307/293, 307/246, 307/263
[51] Int. Cl. .......... H03k 17/26
[50] Field of Search .......... 307/208, 246, 263, 293; 328/55

[56] References Cited

UNITED STATES PATENTS

| | | | |
|---|---|---|---|
| 3,073,972 | 1/1963 | Jenkins | 307/293X |
| 3,244,907 | 4/1966 | Daigle, Jr. | 307/293X |
| 3,376,436 | 4/1968 | Hines et al. | 307/293 |

OTHER REFERENCES

Pub I " TIMING CIRCUIT" by Hines & Radzik in IBM Tech Disclosure Bulletin Vol. 6, No. 7, Dec. 1963, pages 34 & 35

Pub II " INTEGRATOR TIMER" by Smith in IBM Tech Disclosure Bulletin Vol. 8, No. 2, July 1965 pages 322 & 323

*Primary Examiner*—Stanley D. Miller, Jr.
*Attorneys*—Hanifin and Jancin and Joe L. Koerber

ABSTRACT: A delay circuit arrangement is provided wherein the output level is changed a predetermined time after a change of input level and that output level is then maintained until the input is returned to its original level. A first transistor $T_1$ is normally conducting and a second transistor $T_2$ is normally cut off. Both the input and output levels are up and a capacitor C is charged positively. When the input signal is applied, by closed a switch in the base circuit of $T_1$, the capacitor C is connected to ground. Both transistors are now cut off and the capacitor discharges to the ground connection until a value is reached at which $T_2$ will turn on. The time delay between input and output is substantially independent of the particular transistor characteristics and directly proportional to the value of C.

When the input switch is opened, a very rapid recharge of C takes place, very quickly cutting off $T_2$ and restoring the original output level.

INVENTOR
HANS Y. JULIUSBURGER

BY Joe L. Koerber
ATTORNEY

ASYMMETRIC DELAY CIRCUIT

BACKGROUND OF THE INVENTION

The present invention relates to a delay circuit capable of performing a sequence of output level changes while eliminating problems caused by spike pulses at logical transition times.

In the past, circuits to accomplish these functions have been generally more complex, consisting of various combinations of latches, single shot multivibrators and logical AND and OR circuits. Such circuits not only are more costly but also physically require more which, in the present circuit technologies, is at a premium.

SUMMARY OF THE INVENTION

A two transistor circuit is provided having a first transistor $T_1$ biased by the conducting state of $T_1$ to be normally cut off.

A normally charged capacitor C is connected in parallel with the base-collector of $T_1$. A switch is provided to switch the base of $T_1$ and one side of the capacitor C from its normal potential to a reference potential thus cutting off $T_1$. The capacitor C commences discharging through the switch to ground but, until discharged to a given level, it maintains $T_2$ cutoff through its connections to the base of $T_2$. When C discharges to the base turn-on voltage is maintained and is almost exactly balanced by the charge across capacitor C. When the switch is opened, terminating the input signal, the capacitor C commences recharging $T_2$ is almost instantly cut off, restoring the original output level. The circuit is asymmetric in that the output level change is delayed from the time the input signal is applied but is not similarly delayed when the input signal is removed.

It is a primary object of this invention to produce an improved delay circuit.

It is a further object of this invention to provide an improved circuit to produce an output signal a predetermined time after the application of an input signal.

It is further object of this invention to provide an improved circuit to produce an output signal a predetermined time after the application of an input signal.

Another object of this invention is to provide an improved delay circuit to generate an output square voltage whose leading edge is delayed by a specified amount of time from the leading edge of an applied input voltage.

It is a feature of this invention that the output delay is a simple function of a single capacitor and is substantially independent of the transistor characteristics.

It is another feature of the invention that transient spike signals in the output are avoided.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
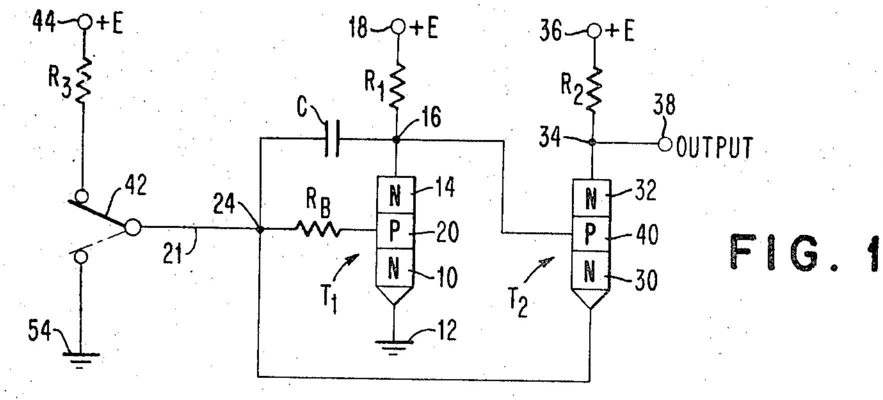
FIG. 1 is a circuit schematic of one embodiment of the invention.

Referring to FIG. 1, an NPN transistor $T_1$ has its emitter 10 connected to a reference level (ground) at 12 and its collector 14 connected through a terminal 16 and a resistor $R_1$ to a power supply represented by a terminal 18. The base 20 is connected through a base resistor $R_B$ to an input line 21.

A capacitor C is connected between terminal 16 in the collector circuit of $T_1$ and a point 24 on input line 21.

A second NPN transistor $T_2$ has its emitter 30 connected to the point 24, its collector 32 connected through a terminal 34 and a resistor $R_2$ to a power supply represented by a terminal 36. The output of the circuit is a terminal 38 connected to the collector of $T_2$ via terminal 34. The base 40 of T2 is connected to terminal 16 in the collector circuit of $T_1$.

The input line 21 is connected through a switch 42 and a resistor $R_3$ to a power supply terminal 44. Line 21 may alternatively be connected by switch 42 to ground at 54. For the purpose of illustration, the means for applying input signals to the circuit in the form of voltage levels is shown schematically as the switch 42; however, it will be understood that suitable switching means such as transistors, gates, etc. would normally be used.

Also, while transistors $T_1$ and $T_2$ are shown as the NPN type, it will b obvious that other types of transistors, e.g. PNP transistors may be used with suitable circuit modifications which are within the skill of the art.

Positive voltage +E are applied to terminals 18, 44 and 36 and the circuit is such that $T_1$ is normally conducting. With $T_1$ conducting, the terminal 16 is relatively negative due to the flow of current from terminal 18, through resistor $R_1$ and transistor $T_1$ to ground at 12. Thus, with the negative bias applied from point 16 to the base 40 of $T_2$ and the emitter tied to the positive potential at 24, $T_2$ is cut off. For For reference purposes hereinafter, the point 16 is designated as the base input to $T_2$.

Initially, both the input line 21 and the output 38 are at the UP level. The capacitor C, connected as it is between +E at 44 and substantially ground at 16, is charged to a voltage level given by $$V_C = \frac{R_B}{R_B + R_3} E \qquad (1)$$

Figure 2:
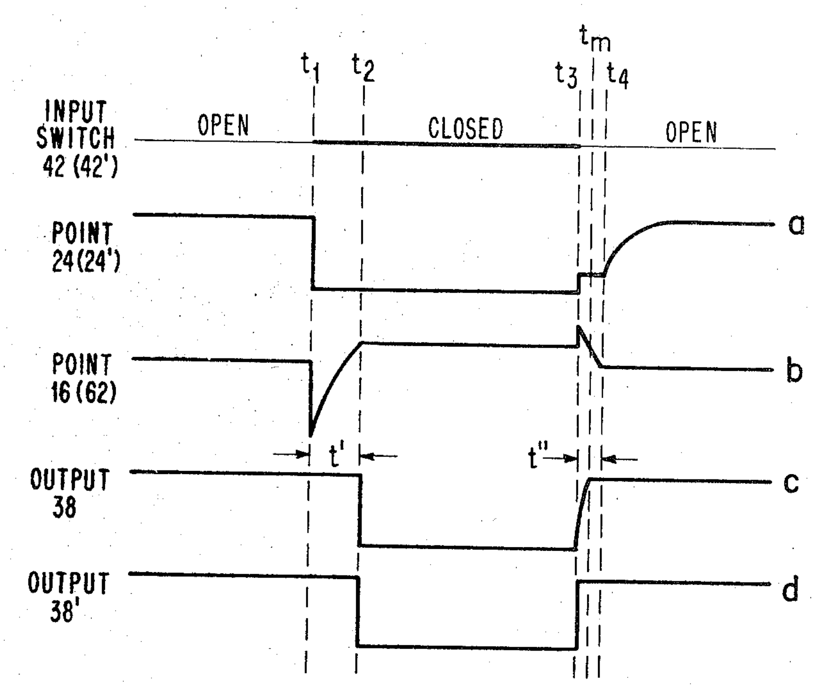
FIG. 2 is a schematic representation of the switch operation and waveforms at various points in the circuits of FIGS. 1 and 3.

When switch 42 is connected to ground at 54 at time $t_1$, *FIG. 2, the base 20 of $T_1$ drops to ground and $T_1$ is immediately cut off. The formerly positive (left-hand) side of C is now a ground level. Since the voltage across the capacitor cannot change instantaneously, the point 16 is negative, that is, below ground level, and $T_2$ is prevented from conducting at this time.*

The discharge path for C is from terminal 18, through resistor $R_1$, capacitor C and switch 42 to ground at 54, in accordance with the equation $$V = E\left[1 - \frac{2R_B + R_1}{R_B + R_1}\,\epsilon^{-\frac{t}{R_1 C}}\right] \qquad (2)$$

in which:

$V$=voltage at point 16

$E$=supply voltage $t$=time $\epsilon$=2.718, the base of natural logarithms.

In the derivation of the above equation, it is assumed that the collector resistance $R_1$ is equal to the input resistance $R_3$, a reasonable assumption in practical circuits.

The discharge of C continues until time $t_2$, *in FIG. 2, at which time point 16 reaches the base turn-on voltage $V_BE$ for transistor $T_2$ ($V_BE \approx .8v.$). Thereafter, $T_2$ commences to conduct and point 16 remains clamped to this voltage level. The output 38 goes to the DOWN level.*

By setting V in equation (2) above to $V = V_BE$ and rearranging the equation, the time $t'$ is determined by the equation $$t' = t = R_1 C\left[\ln\left(\frac{2R_B + R_1}{R_B + R_1}\right) - \ln\left(1 - \frac{V_{BE}}{E}\right)\right] \approx R_1 C \ln\frac{2R_B + R_1}{R_B + R_1} \qquad (3)$$

if $V_{BE} << E$.

Thus, for given values of $R_B$ and $R_1$, time $t'$ is directly proportional to C.

When the switch 42 is opened at time $t_3$ a very rapid reversal to original conditions takes place. At time $t_3$ both points 24 and 16 go up by approximately $V_BE'$ the turn-on voltage of transistors $T_1$ and $T_2$. Thereafter capacitor C discharges and subsequently recharges in the opposite direction with part of the current taking a path from terminal 44 through resistor $R_3$, capacitor C and transistor $T_1$ to the reference (ground) point at 12 until po point 16 has reached the reference level at time $t_4$ at which time transistor $T_1$ is again fully conducting. The time interval between $t_3$ and $t_4$ is given by the approximate equation $$t_4-t_3=t''\approx\frac{R_B}{\beta R_1}t' \qquad (4)$$

in which $\beta$ is the emitter current gain of transistor $T_1$.

With typical circuit values the recovery time $t'$ is about 6 percent of the delay time '.

Since prior to time $t_3$, the turn-on voltage $V_BE$ of transistor $T_2$ was exactly balanced by the charge across capacitor C. the least reduction of charge across C (expressed by the differences in voltage levels between points 16 and 24 in FIG. 2) will initiate the cutoff of transistor $T_2$ and the raising of the output voltage 38 toward its original level. This process is completed approximately at the midpoint $t_m$ between times $t_3$ and $t_4$, thus causing the delay time from opening of the switch 42 to restoration of the output level to its original condition to be approximately 3 percent of the input delay '

A suitable circuit in accordance with this invention was built using components having the following values and operating characteristics

| | | |
|---|---|---|
| $R_1$ | ohm | 10K |
| $R_2$ | ohm | 10K |
| $R_3$ | ohm | 10K |
| $R_B$ | ohm | 6K |
| C | microfarads | 0.1 |
| +E (18) | volts | 12 |
| +E (22) | do | 12 |
| +E (36) | do | 12 |
| Input (24): | | |
| UP Level | do | 4.5 |
| DOWN Level | do | 0 |
| Output (38): | | |
| UP Level | volts (loaded) | 4.5 |
| DOWN Level | volts | 0 |
| Time t' | milliseconds | 0.38 |
| Time t'' | microseconds | 20.00 |
| Transistors | NPN silicon transistors.[1] | |

[1] Which are part of standard IBM FTX modules pn 361497.

While it is not required that he collector resistances $R_1$, $R_2$ and $R_3$ be identical as in the above illustration, they may be and thus existing solid logic transistor modules which are commonly available may be used.

It will be noted that the output delay $t'$ is a simple function of a single capacitor and is substantially independent of the particular transistor characteristics.

Operational reliability is assured by the fact that the contribution of only a few circuit parameters is critical. Timing accuracy is assured by the fact that all critical elements are passive components.

The design of the delay circuit takes cognizance of the fact that the silicon semiconductor material commonly used in switching modules has a rather low reverse voltage breakdown point. In particular, it is necessary to assure that the reverse base-emitter voltage $V_BE$ not be exceeded In the illustrated circuit, such negative voltage appears at the base of $T_2$. Its value does not exceed $-\frac{R_B}{R_B+R_3}E$ which is satisfactory if typical values of $R_B$ and $R_3$ are being used. However, this value can still be made arbitrarily smaller by inserting an additional resistance in series with the input line.

Figure 3:
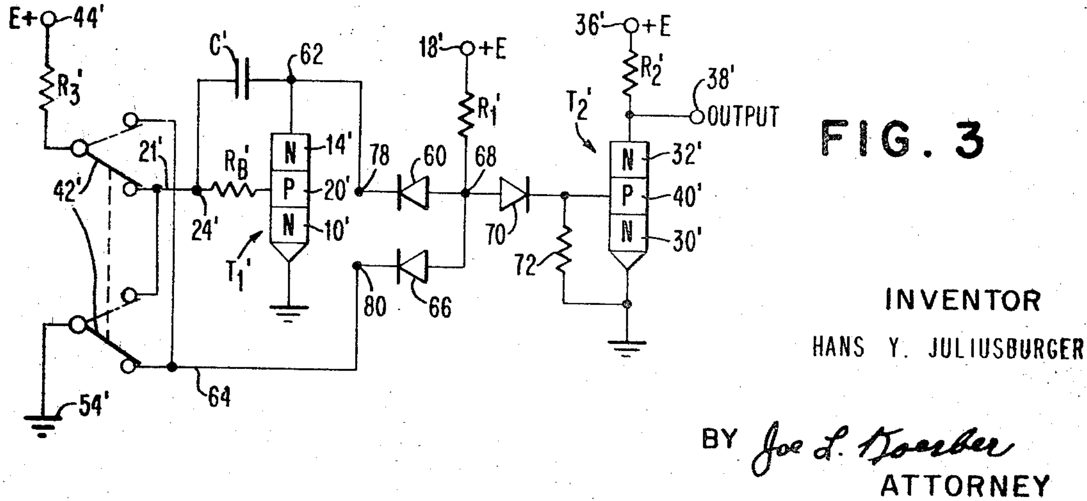
FIG. 3 is a schematic representation of another embodiment of the invention.

Referring to FIG. 3, an alternate embodiment of the invention is shown.

In this embodiment transistors $T_1'$ and $T_2'$ correspond respectively to transistor $T_1$ and $T_2$ in FIG. 1 The base 20' of $T_1'$ is connected to the input line 21' through as base resistor $R_B'$, the emitter 10' is grounded and the collector 14' is connected to a power supply represented by a terminal 18', through a diode 60 and a collector resistor R'A capactior C' is connected between a point 24' on the input line 21' and a point 62 between the collector of $T_1'$ and diode 60.

A second input line 64 connected through a diode 66 to a point 68 between diode 60 and R'.

The line 21' is connected initially to terminal 44' and can be connected by part of the double pole double throw switch 42' to ground at 54' similar to the circuit of FIG. 1 In addition, line 64 is connected initially to ground at 54' through switch 42' and can be connected with terminal 44' by throwing the switch. Thus, by throwing the switch,the complementary voltages on lines 21' and 64 may be reversed.

The base 40' of the transistor $T_2'$ is connected, through a diode 70 to the point 68. The emitter 30' is grounded and its base 40' is also tied to ground through a resistor 72 to assure that, in the quiescent state, the base of $T_2'$ is at the ground level. the collector 32' is connected to an output terminal 38' and through a resistor $R_2'$ to a power supply 36'.

In operation, the inputs to lines 21' and 64 are complementary and, it is assumed they are applied simultaneously although, for reasons pointed out hereinafter, they need not be precisely simultaneous.

In the quiescent state, the signal level on line 21' is UP and that on line 64 is DOWN; transistor $T_1'$ is conducting and $T_2'$ is cut off; the output level at 38' is UP. capacitor C' is charged by the UP level on line 21'. The point 78 is at the DOWN level due to conduction of $T_{40}$. The level at point 80 is DOWN due to the input level on line 64. Thus, the AND gate formed by diodes 60 and 66 and resistor $R_1'$ is closed.

To actuate the circuit, the levels on lines 21' and 64 are reversed. The DOWN level input on line 21' cuts off $T_1'$ and capacitor C' begins discharging along the path including terminal 18', resistor $R_1'$, diode 60, capacitor C' and line 21' to the DOWN level reference at 54' (essentially ground).

When C' has discharged sufficiently, the point 78 reaches a level at which, if the connection were directly to point 68, $T_1'$ would conduct as in the embodiment of FIG. 1 However, due to the AND gate function of diodes 60 and 66, the coincidence of the UP level at point 80 is required. Since, with the complementary input on line 64, both points 78 and 80 are now UP, point 68 is UP and $T_2'$ conducts, changing the level at output 38' from UP to DOWN.

As stated, the input signals on line 21' and 64 are assumed to be simultaneous. However, the primary purpose of the signal on line 64, is to cut off $T_2'$ quickly at time $t_3$. In view of this, at time $t_1$, the UP level on line 64 may precede the DOWN level on line 21' with no effect at all due to the AND gate function of diodes 60 and 66. Also, the UP level signal on line 21' with no adverse effect so long as it is applied within the time period $t'$, FIG. 2, within which C' discharges to the level where, except for the AND gate, $T_2$40 would conduct.

At time $t_3$, the input levels on lines 21' and 64 against reverse to the UP and DOWN levels respectively. It is at this time that the functional difference between the embodiments of FIGS. 1 and 3 is apparent. In the FIG. 1 embodiment, the cutoff of $T_2$ is delayed by the time required to discharge capacitor C' to the extent that the voltage level at point 16 drops to the cut off level for $T_2$. This is indicated by the sloping trailing edge of the output waveform C in FIG. 2. However, in the FIG. 3 embodiment, the DOWN level on line 64 instantly drops the level at point 80 thus closing the AND gate irrespective of the level at point 78. This instant change is reflected in the vertical trailing edge of output waveform $d$ in FIG. 2.

While the invention has been particularly shown and described with reference to preferred embodiments thereof, it will be understood by those skilled in the art that the foregoing and other changes in form and details may be made therein without departing from the spirit and scope of the invention.

I claim:

1. A delay circuit comprising:

a first transitor circuit having input means and output means and connected to assume a given one of its on and off states when first input voltage conditions are applied to said input means and to assume the other of its said states when second input voltage conditions are applied to said input means, said circuit including a base resistance connected to the base of the transistor of said first circuit, said output means assuming one of two levels selectively depending upon said input voltage conditions;

a second transistor circuit having input means and output means, said input means being connected to said output means of said first transistor circuit and said second transistor circuit being connected to be operative normally to assume a given one of its on and off states in response to a first of said two levels at said output means of said first transistor circuit and to assume the other of its said states in response to the second of said two levels, said output means of said second transistor circuit being selectively at one of two levels depending upon the particular said state of said second transistor circuit;

capacitive means connected in parallel across the base resistance-base collector of the transistor of said first transistor of said first transistor circuit; and switching means operable alternately to first apply said first input voltage conditions to said first transistor circuit input means to place said first transistor circuit in said one state and to charge said capacitive means, and thereafter to change said first input voltage conditions to said second input voltage conditions to cause said first transistor circuit to assume said other state and to provide a discharge path for said capacitvie means, said capacitive means being effective to override said normal operation of said second transistor circuit to assume said given state, until said capacitive means has discharged to a predetermined level.

2. A delay circuit comprising:

a first transistor having an input and an output and connected in circuit to assume a given one of its on and off states when a first input voltage level is applied to said input and to assume the other of its said states when a second input voltage level is applied to said input, said input including a base resistor, said output being at one of two levels selectively depending upon said input voltage level; levels, said output of said second selectively a second transistor having an input an an output, said input being connected to said output of said first transistor and said second transistor being connected in circuit to to be operative normally to assume a given one of its on and off state in response to a first of said two levels at said output of said first transistor and to assume the other of its said states in response to the second of said two levels, said output of said second transistor being selectively at one of two levels depending upon the particular said state of said second transistor;

a capacitive element connected in parallel across said input and said output of said first transistor; and switching means operable alternately to first apply said first input voltage level to place said first transistor in said one state and to charge said capacitive element. and thereafter to change said first input voltage level to said second input voltage level to cause said first transistor to assume said other state and to provide a discharge path for said capacitive element, said capacitive element being effective to override said operation of said second transistor to assume said given state, until said capacitive element has discharged to a predetermined level.

3. A delay circuit comprising:

a first transistor having an input and an output and connected in circuit to turn on when a first input voltage level is applied to said input and to be cut off when a second input voltage level is applied to said input, said input including a base resistor, said output being at one of two levels selectively depending upon said input voltage level;

a second transistor having an input and an output said input being connected to said output of said first transistor and said second transistor being connected in circuit to be operative normally to turn on in response to a first of said two levels at said output of said first transistor and to be cut off in response to the second of said two levels, said output of second transistor being selectively at one of two levels depending upon the conductive condition of said second transistor;

a capacitive element connected in parallel across said input and said output of said first transistor; and switching means operable alternately to first apply said first input voltage level to turn on said first transistor and to charge said capacitive element, and thereafter to change said first input voltage level to said second input voltage level to cut off said first transistor and to provide a discharge path for said capacitive element, said capacitive element being effective to override said normal turn on said second transistor until said capacitive element has discharged to a predetermined level.

4. A delay circuit comprising:

a first transistor having an input and an output and connected in circuit to be on when a first input voltage level is applied to said input and to be off when a second input voltage level is applied to said input, said input including a base resistor, said output being at one of two output levels when said transistor is on and at the other when said transistor is off;

an AND gate having a first and a second input and an output, said first input being connected to said output of said first transistor, said AND gate having a first voltage level at its output when open and a second voltage level at its output when closed, said AND gate normally opening when said first transistor output is at the same level, said AND gate being closed when either said input to said AND gate is at said one output level of said first transistor;

a second transistor having an input and an output, said input being connected to said output of said AND gate and said second transistor being connected in circuit to be on when said AND gate is open and to be off when said AND gate is closed, said output of said second transistor being a given level when said second transistor is on and at another level when said second transistor is off;

a capacitive element connected in parallel across said input and said output of said first transistor; and switching means operable alternately to apply said first input voltage level to said first transistor input and a complementary fist input voltage level to said second input of said AND gate, said complementary first input voltage level corresponding to said given one output level of said first transistor, to turn on said first transistor, to charge said capacitive element, and to close said AND gate and thereafter to apply said second input voltage level to said first transistor input and a complementary second input voltage level to said second input of said AND gate, said second complementary input level of said first transistor, to turn off said first transistor, to condition said AND gate and to provide a discharge path for said capacitive element, said capacitive element being effective to override said normal opening of said AND gate until said capacitive element has discharged to a predetermined level which time said AND gate is opened and said second transistor is turned on.

5. A DELAY CIRCUIT COMPRISING:

a first transitor transistor inverter circuit having a base input and an output and normally biased at its input to the conducting state said input including a resistor in the base circuit of said transistor;

a second transistor inverter circuit having a base input and an output and having its input connected to the output of said first inverter circuit whereby said second inverter circuit is nonconducting when said first inverter circuit is conducting;

a capacitive element connected across said input and output of said first inverter circuit, said capacitive element being charged by said input bias to said first inverter circuit when said first inverter circuit is conducting; and means for removing said input bias from said first inverter circuit and providing a discharge path for said capacitive element to effect cut off of the transistor of said first inverter circuit and, after said capacitive element has discharged a predetermined amount, to effect turn on of the transistor of said second inverter circuit to change the level at its output.

6. A delay circuit comprising:

a first transistor having an input and an output and connected in an operating circuit with its input normally biasing said transistor to a conducting state, said input including a base resistor;

a second transitor having an input an an output connected in an operating circuit and having its input connected to the output of said first transitor biasing said second transistor to a nonconducting state when said first transistor is in said conducting state;

a capacitor connected across said input and output of said first transistor said capacitor being charged by the normal biasing applied to last said input;

means for applying a cut off bias to said input of said first transistor and for providing a discharge path for said capacitor;

whereby said capacitor discharges to a level where said second transistor conducts and provides a level change at its said output.

7. A delay circuit comprising:

a first transistor having a collector, a base and an emitter, said collector being connected through a collector resistor to a power supply and said emitter being connected to ground, said base being connected through a base resister to an input;

a capacitor connected at one end to a point between said collector and said collector resistor and at the other end to said input;

a second transistor having a collector, a base and an emitter, said collector being connected through a collector resistor to a power supply, said emitter being connected to said input of said first transistor and said base being connected to said point between said collector and said collector resistor of said first transistor;

an output terminal connected between said collector and said collector resistor of said second transistor;

a two-level input voltage source; and means for alternately connecting said input first to one said level of said input voltage source and then to the other.

8. A delay circuit comprising:

a two-input AND gate connected to a power supply and having an output;

a first transistor having a collector, a base and an emitter, said collector being connected to one input of said AND gate said emitter being connected to ground, said base being connected through a base resistor to a first input means;

a second input means connected to the other input of said AND gate;

a capacitor connected a one end to a point between said collector and said AND gate and at the other end to said first input;

a second transistor having a collector, a base and an emitter, said collector being connected through a collector resistor to a power supply, said emitter being connected to ground, and said base being connected to said output of said base being connected to said output of said AND gate;

an output terminal connected between said collector and said collector resistor of said second transistor;

a two-level input voltage source for connection of one level to said first input means and the other level to said second input means; and means for alternately switching the said one an said other input voltage levels between said first and second input means.

9. A delay circuit comprising:

a two-input AND gate connected to a power supply and having an output;

a first transistor having collector, a base and an emitter, said collector being connected to one input of said AND gate said emitter being connected to ground, said base being connected through a base resistor to a first input means;

a second input means connected to the other input of said AND gate;

a capacitor connected at one end to a point between said collector and said AND gate and at the other end to said first input;

a second transmitter having a collector, a base and an emitter, said collector being connected through a collector resistor to a power supply, said emitter being connected to ground, and a said base being connected through a diode to said output of said AND gate;

an output terminal connected between said collector and said collector resistor of said second transistor;

a two-level input voltage source for connection of one level to said first input means and the other level to said second input means; and means for alternately switching the said one and said other input voltage levels between said first and second input means.

PO-1050
(5/69)

UNITED STATES PATENT OFFICE
CERTIFICATE OF CORRECTION

Patent No. 3,551,705 Dated December 29, 1970

Inventor(s) Hans Y. Juliusburger

It is certified that error appears in the above-identified patent and that said Letters Patent are hereby corrected as shown below:

Column 5, line 50, cancel "levels, said output of said secon selectively"; line 70 after "said" (first occurrence) insert -- normal --. Column 6, line 38, after "at" insert -- said other level and said second input to said AND gate is at --; line 54, change "fist" to -- first -- ; line 63, after "input" insert -- voltage level corresponding to said other output -- ; line 68, after "level" insert -- at -- . Column 8, lines 18 and 19, cancel "of said base being connected to said output"; line 41, cancel "transmitter" and insert -- transistor -- .

Signed and sealed this 28th day of November 1972.

(SEAL)
Attest:

EDWARD M.FLETCHER,JR.
Attesting Officer

ROBERT GOTTSCHALK
Commissioner of Patent